(No Model.)

E. D. MISNER & G. A. WEIGHTMAN.
BALL BEARING VEHICLE AXLE.

No. 592,935. Patented Nov. 2, 1897.

Witnesses
W. D. Jones
Gertrude Jenkins

Inventors
Edgar D. Misner
George A. Weightman

UNITED STATES PATENT OFFICE.

EDGAR D. MISNER AND GEORGE A. WEIGHTMAN, OF BRANTFORD, CANADA.

BALL-BEARING VEHICLE-AXLE.

SPECIFICATION forming part of Letters Patent No. 592,935, dated November 2, 1897.

Application filed December 14, 1895. Renewed April 15, 1897. Serial No. 632,342. (No model.)

*To all whom it may concern:*

Be it known that we, EDGAR D. MISNER, solicitor, and GEORGE A. WEIGHTMAN, machinist, residing in the city of Brantford, in the county of Brant, in the Province of Ontario, Canada, subjects of the Queen of Great Britain, have invented new and useful Improvements in Ball-Bearing Vehicle-Axles, of which the following is a specification.

Our invention relates to improvements in ball-bearing vehicle-axles.

Figure 1:
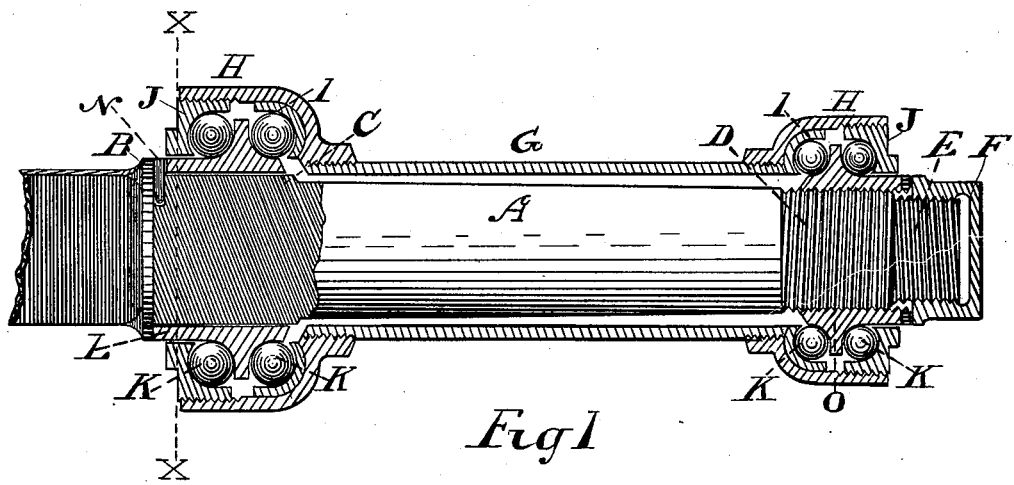
Figure 2:
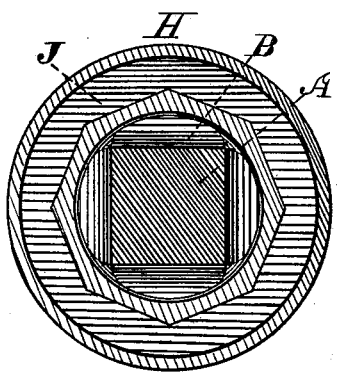
Figure 3:
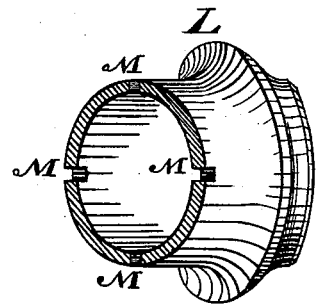

Figure 1 is a sectional view of a ball-bearing axle embodying our invention. Fig. 2 is a cross-sectional view of same on lines X X. Fig. 3 is a view of cone L, showing notches in end of same.

Similar letters refer to similar parts throughout the several views.

A is an axle, of the requisite shape and form, made of steel or other suitable material, on which is formed a shoulder B. Adjacent to shoulder B is formed, by turning, a raised parallel bearing-surface C, slightly larger in diameter than the remainder of round part of axle. The axle is also turned tapering from bearing-surface C the desired distance and slightly less in diameter at its nut end than at its shoulder end. There is also formed near its nut end a left-hand screw-threaded bearing-surface D. The axle is then made less in diameter and a right-hand screw-thread E is continued to its end to receive and hold a jam-nut F. The boxing consists of a piece of tubing G of the desired size, screw-threaded at both ends to hold shells H and H, respectively. The shells H and H are bored out on their inner diameters to form bearings for steel cups I and I, respectively. The outer ends of shells H and H are then screw-threaded on their inner faces to securely hold screw-threaded cups J and J, respectively. The inner faces of cups I I and J J form bearing-races, each for one row of balls K and K, respectively.

The arc of bearing-races in cups I I and J J are larger than the diameters of balls K K. The outer ends of cups J J are made octagon (see Fig. 2) to admit of the application of a wrench for adjusting purposes. Resting against the shoulder B and encircling the bearing-surface C is a hardened-steel cone L.

The cone L has at its left-hand end a number of notches M M M M (see Fig. 3) to fit pin N, that is fastened in the top of axle A.

The cone L has formed on its outer side smooth ball-races, one on each side of a bead, the arcs of which are similar to those in cups I I and J J.

The cone O at nut end of axle has in its inner bore left-hand screw-threads to engage in threads D on axle A, and is also notched out on its right-hand end to receive a wrench for adjusting purposes. The ball-races, arcs, and bead on its outer face are similar to those on cone L.

The operation of our axle can be readily understood by referring to the drawings.

By constructing an axle and boxing to retain and hold two rows of balls at each end at proper angles having two points of contact only for each ball and having the points of contact as near as possible in a perpendicular line over the plane of the axle it is easily understood that the carrying qualities of the axle and boxing is greatly increased, while the friction of the same is reduced.

As every ball makes an independent revolution on its own axis as well as a circling revolution around the axle we deem it also of very great importance to lengthen the wear on the balls to have them revolve as near as possible on a perpendicular line. The cone L being loose on the axle is kept from revolving around the same by having it placed on so that one of the notches in left-hand end, as shown in Fig. 3, will engage with pin N in top of axle A.

As cone L is not a permanent fixture on axle A, but is held only by the pin N, as already described, it can be turned on different angles of its circumference, which graduates the wear on cone evenly all around, by merely placing a different notch against pin N whenever deemed necessary. Cones L and O are held in their place in the shells of the box by bearing against each row of balls on each side of their beads, the balls in their turn, in the manner already described, bearing against the races in the cups I I and J J.

The screw-threads in bore of cone O engaging in threads D on axle A readily admit of it being removed or replaced on same.

It will be seen that when removing the boxing from axle A the cups I I and J J, balls K K, and cones L and O are removed also and remain in said boxing.

To place boxing on axle, all that is necessary is to enter cone L over the point of axle A, push on boxing until threads D become engaged with threads in cone O, then turn cone O on lefthanded until you get the proper adjustment, then screw on jam-nut F tight.

We are aware that prior to our invention thereof there have been cups and cones made partly similar to those shown in our application. Therefore we do not claim such broadly; but What we do claim as our own invention, and desire to secure by Letters Patent, is—

1. The combination, with an axle having right and left hand threads, of an axle-box having at its right-hand end an enlarged shell, said shell being so formed on its inner face as to hold one concavo-convex cup, said shell threaded internally in its outer end to securely hold an externally-threaded concave cup, a left-hand internally-threaded cone screwed on threaded end of axle, a right-hand internally-threaded jam-nut screwed on and bearing against said cone, said left-hand threads on axle where cone bears being slightly larger in diameter than right-hand threads where jam-nut is placed so as to allow cone being removed without interfering with jam-nut threads, said cups and cone forming raceways for balls, and said balls, all said parts combined substantially as described.

2. The combination, with an axle and a pin therein, of an axle-box having at its left-hand end an enlarged shell, said shell being so formed on its inner face as to hold one concavo-convex cup, said shell threaded internally in its outer end to securely hold an externally-threaded concave cup, a cone being bored out smooth internally large enough to slip on raised parallel bearing-surface on axle, said cone also provided at its outer end with a series of notches, said notches in connection with said pin being to prevent said cone from revolving around the axle, said cups and cones forming raceways for balls, and said balls, all said parts combined substantially as described.

Brantford, December 2, 1895.

EDGAR D. MISNER.
   GEORGE A. WEIGHTMAN.

Witnesses:
 WILL D. JONES,
 GERTRUDE JENKINS.